(12) United States Patent
Marsh

(10) Patent No.: US 6,815,110 B2
(45) Date of Patent: Nov. 9, 2004

(54) FUEL CELL AND POWER CHIP TECHNOLOGY

(75) Inventor: Stephen A. Marsh, Carlisle, MA (US)

(73) Assignee: Integrated Fuel Cell Technologies, Inc., Bedford, MA (US)

( * ) Notice: Subject to any disclaimer, the term of this patent is extended or adjusted under 35 U.S.C. 154(b) by 505 days.

(21) Appl. No.: 09/949,301

(22) Filed: Sep. 7, 2001

(65) Prior Publication Data

US 2002/0045082 A1 Apr. 18, 2002

Related U.S. Application Data

(63) Continuation of application No. 09/449,377, filed on Nov. 24, 1999, now Pat. No. 6,312,846.

(51) Int. Cl.[7] .............................. H01M 8/10; H01M 8/02
(52) U.S. Cl. .............................. 429/30; 429/32; 429/34; 429/38; 429/35; 429/36
(58) Field of Search ................................ 429/12, 13, 22, 429/23, 30, 32, 34, 35, 36, 39, 26, 38

(56) References Cited

U.S. PATENT DOCUMENTS

| | | | |
|---|---|---|---|
| 4,248,941 A | 2/1981 | Louis et al. | |
| 5,559,638 A | 9/1996 | Aoki et al. | |
| 5,811,062 A | 9/1998 | Wegeng et al. | |
| 5,919,583 A | 7/1999 | Grot et al. | |
| 5,945,231 A | 8/1999 | Narayanan et al. | |
| 6,299,744 B1 | 10/2001 | Narayanan et al. | |
| 6,387,556 B1 | 5/2002 | Fuglevand et al. | |
| 6,432,284 B1 | 8/2002 | Narayanan et al. | |
| 6,465,119 B1 | 10/2002 | Koripella et al. | |
| 2003/0138685 A1 * | 7/2003 | Jankowski et al. | 429/30 |

FOREIGN PATENT DOCUMENTS

| | | |
|---|---|---|
| AT | 393 045 B | 7/1991 |
| DE | 199 14 681 A1 | 10/2000 |
| JP | 07 201348 | 8/1995 |
| WO | WO 00/45457 | 8/2000 |
| WO | WO 00/69007 | 11/2000 |

OTHER PUBLICATIONS

About.com, "Fuel Cells—Part 1: Types and How They Operate" (Apr. 4, 1999), <http://energyindustry.about.com/industry/energyindustry/library/weekly/aa040499.htm>.
About.com, "Fuel Cells—Part 2: Uses" (Apr. 25, 1999), <http://energyindustry.about.com/industry/energyindustry/library/weekly/aa042599.htm>.
National Resources Defense Council, "Reports: Choosing Clean Power, Bringing the Promise of Fuel Cells to New York", (visited Oct. 22, 1999) <http://www.nrdc.org/nrdcpro/ccp/ccpinx.html>.
Fuel Cells 2000, "The Online Fuel Center Information Center", (visited Oct. 22, 1999) <http://www.fuelcells.org>.
Institut AG, "Fuel Cell", The Way Things Work: vol. One: 52–53 (George Allen & Unwin Ltd. trans., 1967).
Sasaki, Satoshi and Karube, Isao, "The development of microfabricated biocatalytic fuel cells," *Trends in Biotechnology* 17 (2) :50–52 (1999).

* cited by examiner

Primary Examiner—Bruce F. Bell
Assistant Examiner—Monique Wills
(74) *Attorney, Agent, or Firm*—Hamilton, Brook, Smith & Reynolds, P.C.

(57) ABSTRACT

A fuel cell is disclosed which is formed on a semiconductor wafer by etching channel in the wafer and forming a proton exchange membrane PEM barrier in the etched channel. The barrier divides the channel into two. A hydrogen fuel is admitted into one of the divided channels and an oxidant into the other reacts with a catalyst formed on an anode electrode at the hydrogen side of the channel to release hydrogen ions (protons) which are absorbed into the PEM. The protons migrate through the PEM and recombine with return hydrogen electrons on a cathode electrode on the oxygen side of the PEM and the oxygen to form water.

48 Claims, 8 Drawing Sheets

FUEL CELL AND POWER CHIP TECHNOLOGY

RELATED APPLICATION(S)

This application is a continuation of application Ser. No. 09/449,377, filed Nov. 24, 1999 now U.S. Pat No. 6,312,846. The entire teachings of the above application are incorporated herein by reference.

BACKGROUND OF THE INVENTION

The electrochemical fuel cell is not new. Invented in 1839 by Alexander Grove, it has recently been the subject of extensive development. NASA used its principals in their 1960's space program, but the latest push into this technology is being driven largely by the automotive industry. Daimler-Chrysler and Ford Motor Co. together have invested about $750 million in a partnership to develop fuel cell systems. As environmental concerns mount and legislation toughens, development of "green" energy sources becomes more justified as a course of action, if not required.

The information age has ushered in the necessity for new ways to examine, process, manage, access and control the information. As the basic technologies and equipment evolve to handle these new requirements, there is a growing need for a smaller, lighter and faster (to refuel/recharge) electrical energy source. Portable computing and communications, in particular, would benefit greatly from a miniature fuel cell based power source.

SUMMARY OF THE INVENTION

In accordance with the invention, a method and apparatus is provided which uses a combination of SAMs (self-assembled monolayers), MEMS (micro electrical mechanical systems), "chemistry-on-a-chip" and semiconductor fabrication techniques to create a scalable array of power cells directly on a substrate, preferably a semiconductor wafer. These wafers may be "stacked" (i.e. electrically connected in series or parallel, as well as individually programmed to achieve various power (V*I) characteristics and application driven configurations.

One preferred embodiment of the invention is formed by fabricating a plurality of individual fuel cells on a planar semiconductor wafer into which flow channels are formed by etching or other well-known semiconductor processes. Oxygen is admitted into one side of a channel and hydrogen into the other side; with the two gases being separated by a membrane. Electrodes are formed on opposite sides of the membrane and a catalyst is provided in electrical communication with the electrode and membrane on both sides. Lastly, a gas impermeable cover or lid is attached to the cell.

Preferably, the membrane is a PEM (Proton Exchange Membrane) formed by depositing or otherwise layering a column of polymers into etched channels in the substrate to create a gas tight barrier between the oxygen and hydrogen, which is capable of conveying hydrogen ions formed by the catalyst across the barrier to produce electricity across the contacts and water when the H-ions combine with the oxygen in the other channel.

In addition, a number of fuel cells can be electrically interconnected and coupled to gas sources on a portion of the same wafer to form a "power chip". Traditional electrical circuitry can be integrated on the wafer along with the chips to provide process monitoring and control functions for the individual cells. Wafers containing multiple chips (power discs) or multiple cells can then be vertically stacked upon one another.

A further understanding of the nature and advantages of the invention herein may be realized with respect to the detailed description which follows and the drawings described below.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
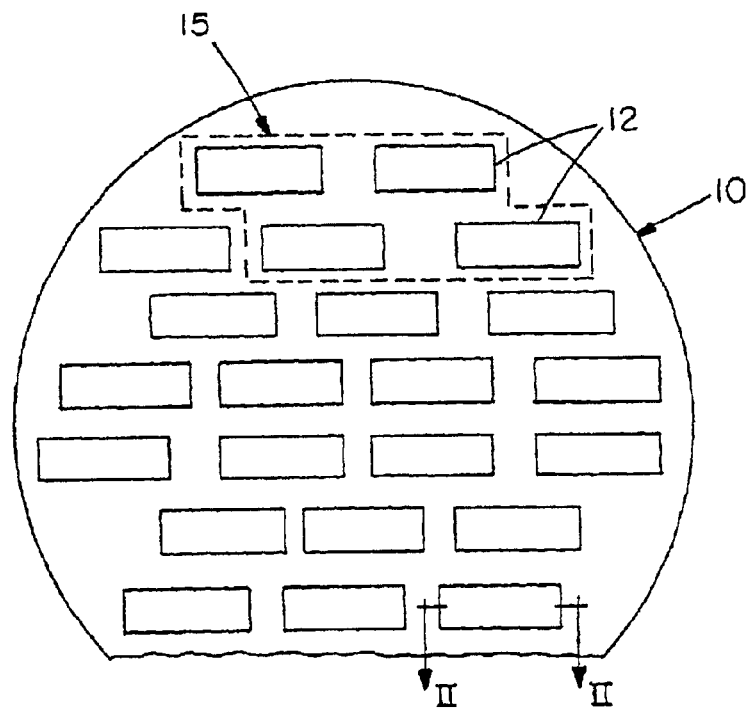
FIG. 1 is a schematic plan view of a semiconductor fuel cell array in accordance with the invention.

Referring now to FIG. 1, there is shown in plan view a conventional semiconductor wafer 10 upon which a plurality of semiconductor fuel cells 12 have been fabricated. A plurality of cells may be electrically interconnected on a wafer and provided with gases to form a power chip 15. For simplicity, fuel cells 12 and chips 15 are not shown to scale in as much as it is contemplated that at least 80 million cells may be formed on a 4" wafer. One such cell is shown in fragmented cross-section in FIG. 2. In its simplest form, each cell 12 consists of a substrate 14, contacts 16A and B, and a conductive polymer base 18 formed on both sides of a first layer 20(a) of non-conductive layered polymer support structure 20 and in intimate contact with the metal electrical contacts.

Figure 2:
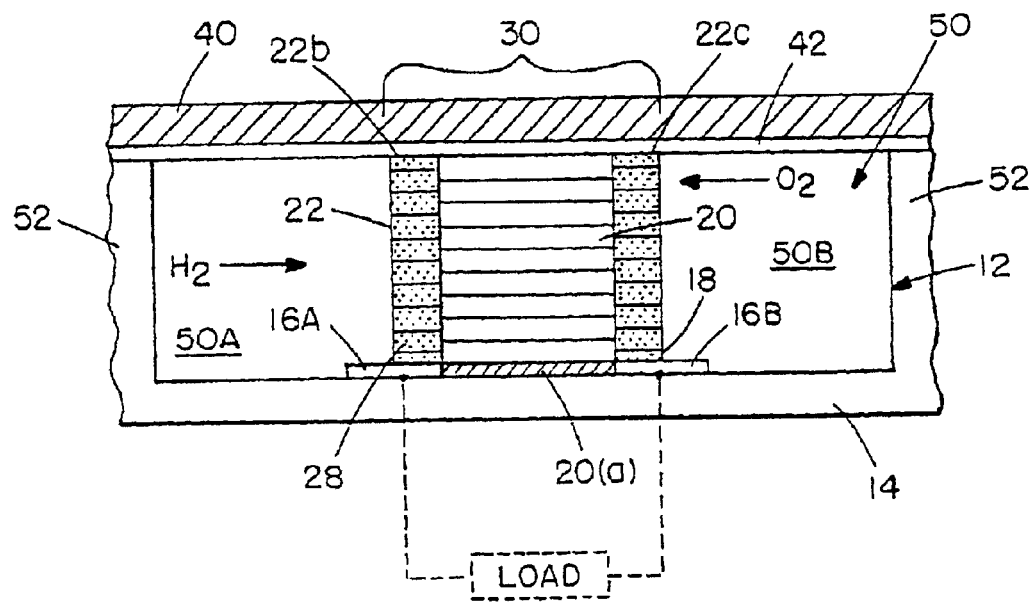
FIG. 2 is a simplified schematic cross-sectional view taken along the lines II—II of a fuel cell 12 of the invention.

A conductive polymer 22 with embedded catalyst particles 28 on both sides of the central structure 20 forms a PEM barrier separating the hydrogen gas on the left side from the oxygen gas on the right side. Etched channels 50B and 50A respectively for admittance of the $O_2$ and $H_2$ gas and a heatsink lid 40 over the cell 12 is also shown in FIG. 2.

Figure 3A:
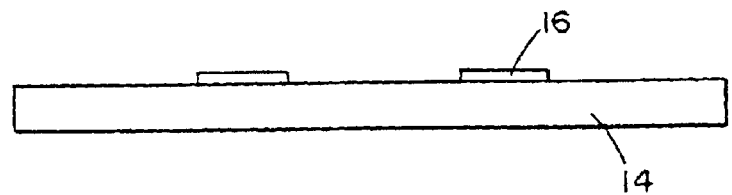
FIGS. 3(a)–(h) is a schematic sectional process view of the major steps in fabricating a PEM barrier structure 30 of the invention.

FIGS. 3a–3h are a series of schematic sectional views showing the relevant fabrication details of the PEM barrier 30 in several steps. FIG. 3a shows the bottom of a power cell channel which has been etched into the semiconductor substrate 14. It also shows the metal contacts 16 which are responsible for conveying the electrons out of the power cell 12 to the rest of the circuitry. These metal contact are deposited by well-known photolithographic processes in the metalization phase of the semiconductor fabrication process.

Figure 3B:
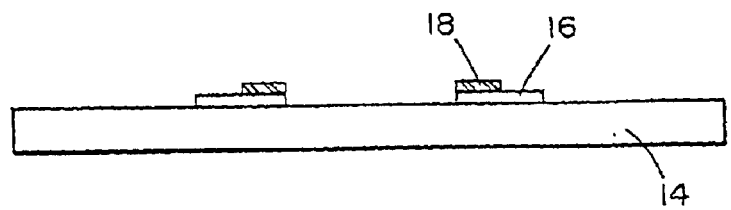

FIG. 3b shows the conductive polymer base 18 as it has been applied to the structure. Base 18 is in physical/electrical contact with the metal contacts 16 and has been adapted to attract the conductive polymer 22 of the step shown in FIG. 3a–3h.

Figure 3C:
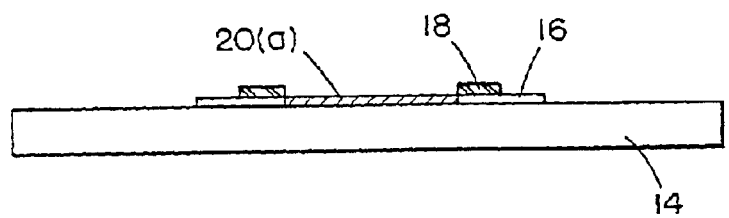

FIG. 3c shows the nonconductive polymer base 20(a) as it has been applied to the structure. It is positioned between the two conductive polymer base sites 18 and is adapted to attract the nonconductive polymer 20.

Figure 3D:
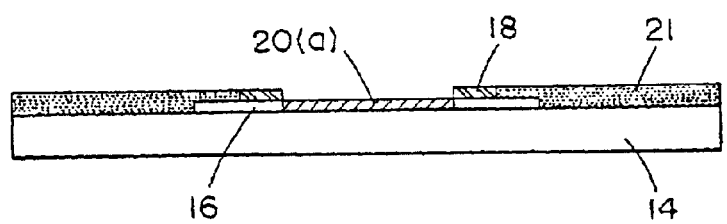

FIG. 3d shows a polymer resist 21 as applied to the structure. Resist 21 is responsible for repelling the polymers and preventing their growth in unwanted areas.

Figure 3E:
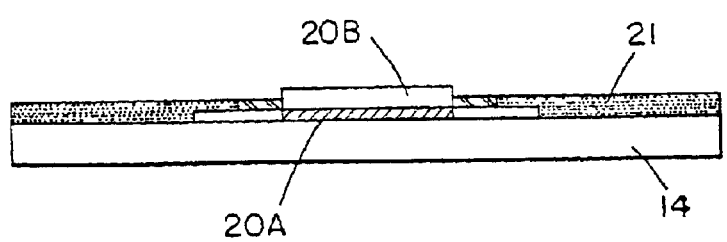

FIG. 3e shows the first layer 20B of nonconductive polymer as it has been grown on its base 20A. This is the center material of the PEM barrier. It helps support the thinner outer sides 22 when they are constructed.

Figure 3F:
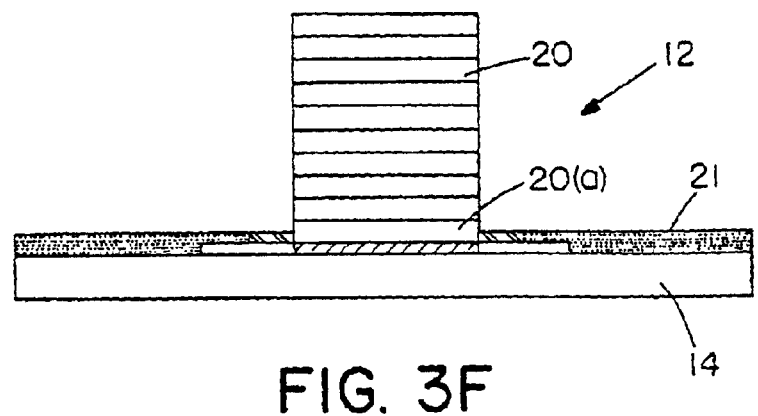

FIG. 3f shows the subsequent layers of nonconductive polymer 20 which are laid down, in a layer by layer fashion to form a vertical barrier. This vertical orientation allows for area amplification.

Figure 3G:
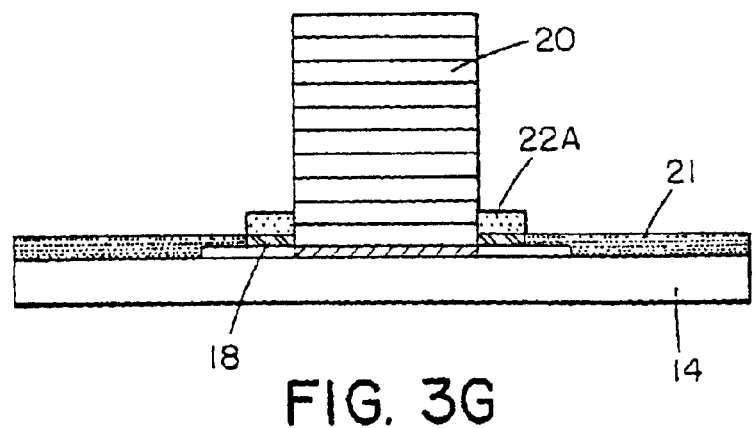

FIG. 3g shows the first layer 22a of conductive polymer grown on its base 18. This is the outside wall material with catalyst of the PEM barrier.

Figure 3H:
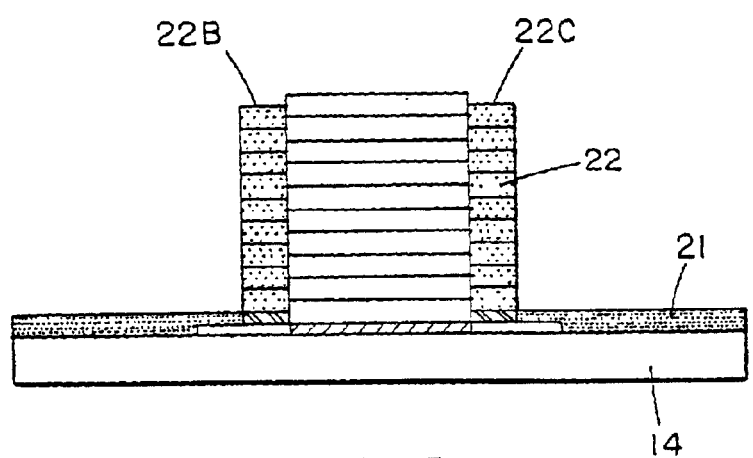

FIG. 3h shows the subsequent layers of conductive polymer 22 laid down, in a layer by layer fashion on to the structure. FIG. 2 shows the completed structure after removal of the polymer resist layer 21 and the addition of lid 40 and the pre-existing sidewalls 52 left out of FIG. 3a–3h for simplicity. This resist removal may not be necessary if layer 21 was originally the passivation layer of the final step in the semiconductor fabrication process.

Referring now to FIG. 2 again further details of the elements forming the fuel cell 12 will be explained. The protein exchange membrane shown generally at 30 forms a barrier between the fuel $H_2$ and the oxidant $O_2$.

The PEM barrier 30 is made up of three parts of two materials. There is the first outside wall 22B, then the center 20, and finally the second outside wall 22C. It is constructed with a center piece 20 of the first material in contact with the two outside walls which are both made of the second material.

The material 20 forming the center piece, is preferably an ionic polymer capable of passing the hydrogen ions (protons) through from the hydrogen side to the oxygen side. It is electrically nonconductive so that it does not, effectively, short out the power cell across the two contacts 16A and 16B. It may be made of Nafion® or of a material of similar characteristics. An external load 5 as shown in dotted lines may be coupled across the contacts to extract power.

The second material 22, forming the two outside walls, is also a similar ionic polymer capable of passing the hydrogen ions. In addition, it is doped with nano catalyst particles 28 (shown by the dots), such as, platinum/alloy catalyst and is also electrically conductive.

By embedding the catalyst particles 28 into the polymer 22, maximum intimate contact is achieved with the PEM 30. This intimate contact provides a readily available path which allows the ions to migrate freely towards the cathode electrode 16B. Catalysis is a surface effect. By suspending the catalytic particles 28 in the polymer 22, effective use of the entire surface area is obtained. This will dramatically increase the system efficiency.

By making the second material 22 electrically conductive, an electrode is produced. The proximity of the electrode to the catalytic reaction affects how well it collects electrons. This method allows the catalytic reaction to occur effectively within the electrode itself. This intimate contact provides a readily available path which allows the electrons to migrate freely towards the anode 16A. This will allow for the successful collection of most of the free electrons. Again, this will dramatically increase the system efficiency.

In addition to the electrical and chemical/functional characteristics of the PEM 30 described above, there are some important physical ones, that are described below:

This self assembly process allows for the construction of a more optimum PEM barrier. By design it will be more efficient.

First, there is the matter of forming the separate hydrogen and oxygen path ways. This requires that the PEM structure to be grown/formed so that it dissects the etched channel 50 fully into two separate channels 50A, 50B. This means that it may be patterned to grow in the center of the channel and firmly up against the walls of the ends of the power cell. It may also be grown to the height of the channel to allow it to come into contact with an adhesive 42 on the bottom of lid 40.

Second, there is the matter of forming a gas tight seal. This requires that the PEM structure 30 be bonded thoroughly to the base structures 18 and 20A, the substrate 14 and the end walls (not shown) of the power cell and to an adhesive 42 which coats the lid 40. By proper choice of the polymers, a chemical bond is formed between the materials they contact in the channel. In addition to this chemical bond, there is the physical sealing effect by applying the lid 40 down on top of the PEM barrier. If the height of the PEM 30 is controlled correctly, the pressure of the applied lid forms a mechanical "O ring" type of self seal. Growing the PEM 30 on the substrate 14 eliminates any fine registration issues when combining it with the lid 40. There are no fine details on the lid that require targeting.

Figure 4:
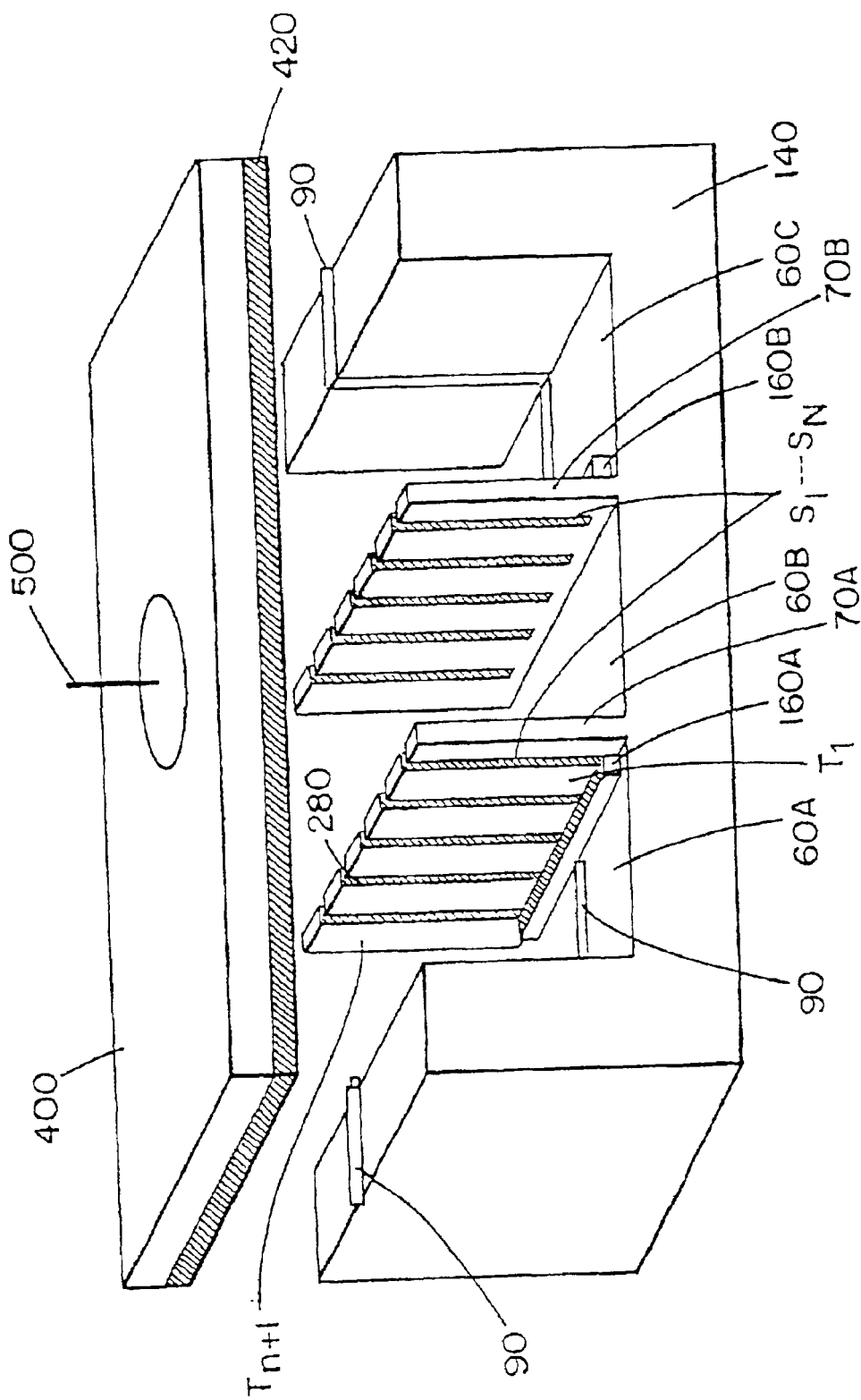
FIG. 4 is a cross-sectional schematic view illustrating an alternate cast PEM barrier invention.

Turning now to FIG. 4, there is shown in simplified perspective an alternate embodiment of a PEM barrier involving a casting/injecting process and structure.

Using MEMS machining methods three channels 60A, 60B and 60C are etched into a semiconductor substrate 140. The outside two channels 60A and 60C are separated from the middle channel 60B by thin walls 70A, 70B. These walls have a plurality of thin slits $S_1$ - - - $S_n$ etched into them. The resultant tines $T_1$ - - - $T_{n+1}$ have a catalyst 280 deposited on them in the area of the slits. At the bottom of these thin walls, 70A, 70B, on the side which makes up a wall of an outside channel 60A, 60C, a metal electrode 160A, 160B is deposited. A catalyst 280 is deposited on the tines after the electrodes 160 are in place. This allows the catalyst to be deposited so as to come into electrical contact and to cover to some degree, the respective electrodes 160 at their base. In addition, metal conductors 90 are deposited to connect to each electrode 160, which then run up and out of the outside channels.

A lid 400 is provided with an adhesive layer 420 which is used to bond the lid to the substrate 140. In this way, three separate channels are formed in the substrate; a hydrogen channel 60A, a reaction channel 60B, and an oxygen channel 60C. In addition, the lid 400 has various strategically placed electrolyte injection ports or holes 500. These holes 500 provide feed pathways that lead to an electrolyte membrane of polymer material (not shown) in the reaction channel 60B only.

The structure of FIG. 4 is assembled as follows:

First, the semiconductor fabrication process is formed including substrate machining and deposition of all electrical circuits.

Next, the lid 400 is machined and prepared with adhesive 420. The lid 400 is bonded to the substrate 140. Then, the electrolyte (not shown) is injected into the structure.

The thin walls 70A, 70B of the reaction channel 60B serve to retain the electrolyte during its casting. The slits $S_1$ - - - $S_N$ allow the hydrogen and oxygen in the respective channels 60A, 60B access to the catalyst 280 and PEM 300. Coating the tines $T_1$ - - - $T_{1+n}$ with a catalyst 280 in the area of the slits provides a point of reaction when the $H_2$ gas enters the slits. When the electrolyte is poured/injected into the reaction channel 60B, it fills it up completely. The surface tension of the liquid electrolyte keeps it from pushing through the slits and into the gas channels, which would otherwise fill up as well. Because there is some amount of pressure behind the application of the electrolyte, there will be a ballooning effect of the electrolyte's surface as the pressure pushes it into the slits. This will cause the electrolyte to be in contact with the catalyst 280 which coats the sides of the slits $S_1$ - - - $S_N$. Once this contact is formed and the membrane (electrolyte) is hydrated, it will expand even further, ensuring good contact with the catalyst. The $H_2/O_2$ gases are capable of diffusing into the (very thin, i.e. 5 microns) membrane, in the area of the catalyst. Because it can be so thin it will produce a more efficient i.e. less resistance ($I^2R$) losses are low. This then puts the three components of the reaction in contact with each other. The electrodes 160A and 160B in electrical contact with the catalyst 280 is the fourth component and provides a path for the free electrons [through an external load (not shown)] while the hydrogen ions pass through the electrolyte membrane to complete the reaction on the other side.

Figure 5:
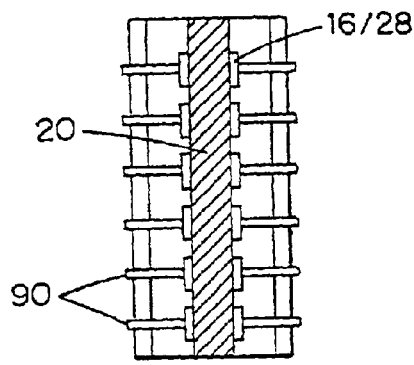
FIG. 5 is a sectional view of a PEM structure embodiment.
Figure 6:
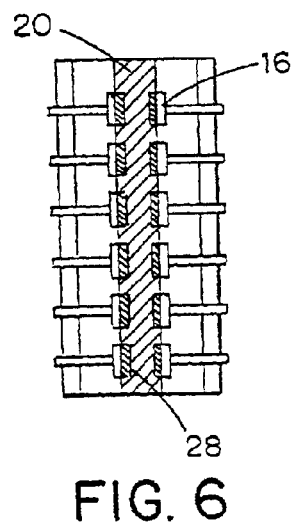
FIG. 6 is a sectional view of an alternate of the PEM structure.
Figure 7:
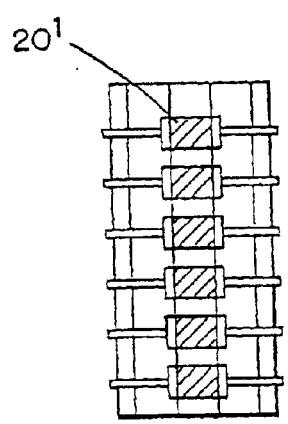
FIG. 7 is a sectional view of another alternate PEM structure.

Referring now to the cross-sectional views of FIGS. 5–7, various alternate configurations of the PEM structure 30 of the invention will be described in detail. In FIG. 5, the central PEM structure 20 is formed as a continuous non-conductive vertical element, and the electrode/catalyst 16/28 is a non-continuous element to which lead wires 90 are attached. FIG. 6 is a view of an alternate PEM structure in which the catalyst 28 is embedded in the non-conductive core 20 and the electrodes 16 are formed laterally adjacent the catalyst. Lastly, in FIG. 7, the PEM structure is similar to FIG. 5 but the center core $20^1$ is discontinuous.

Figure 8:
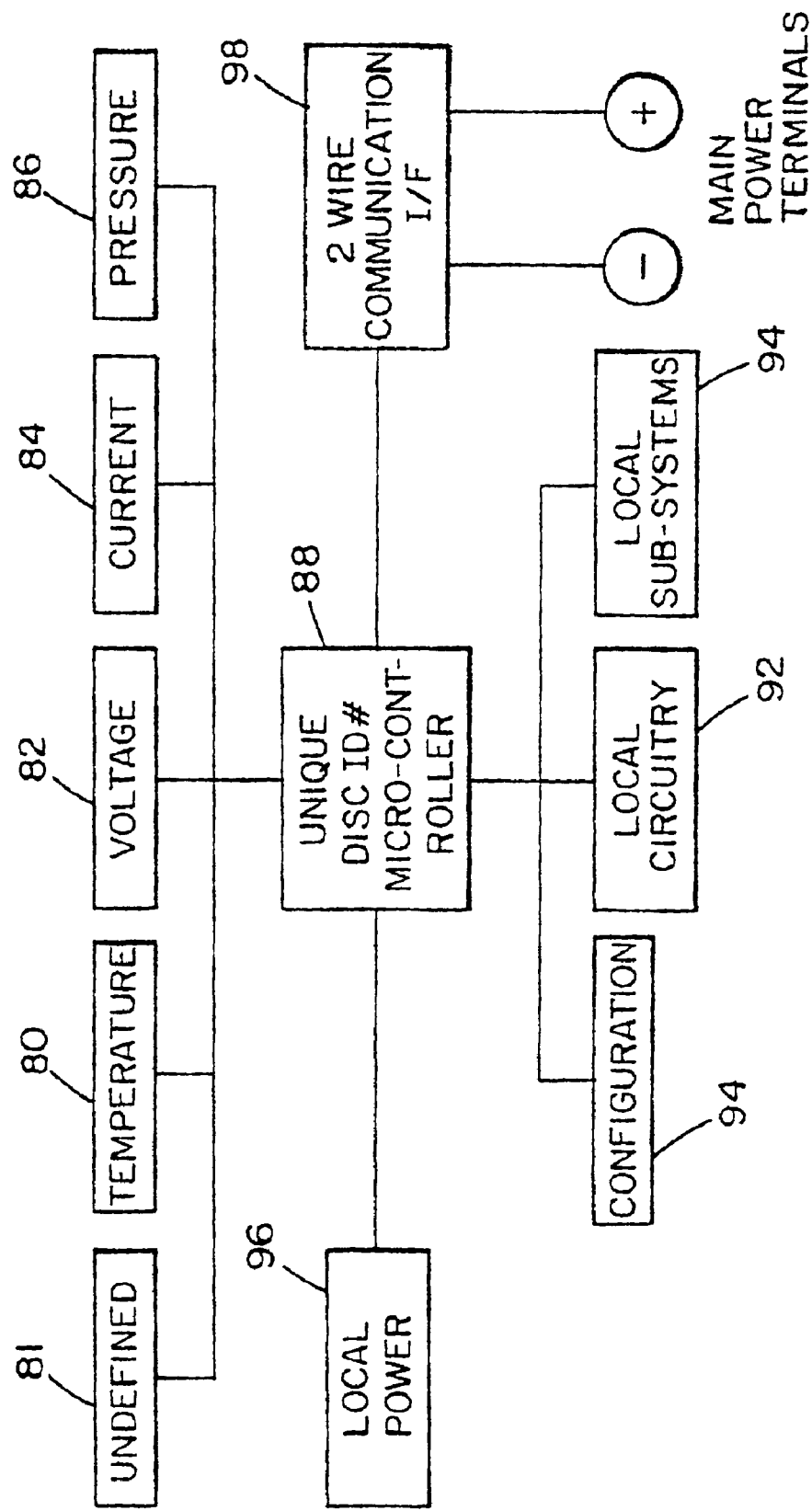
FIG. 8 is a block diagram of circuitry which may be integrated onto a fuel cell chip.

FIG. 8 is a schematic block diagram showing some of the possible circuits that may be integrated along with a microcontroller onto the semiconductor wafer 10 to monitor and control multiple cells performance. Several sensor circuits 80, 82, 84 and 86 are provided to perform certain functions.

Temperature circuit 80 provides the input to allow the microprocessor 88 to define a thermal profile of the fuel cell 12. Voltage circuit 82 monitors the voltage at various levels of the configuration hierarchy or group of cells. This provides information regarding changes in the load. With this information, the processor 88 can adjust the system configuration to achieve/maintain the required performance. Current circuit 84 performs a function similar to the voltage monitoring circuit 82 noted above.

Pressure circuit 86 monitors the pressure in the internal gas passages 50A, 50B. Since the system's performance is affected by this pressure, the microprocessor 88 can make adjustments to keep the system running at optimum performance based on these reading. An undefined circuit 81 is made available to provide a few spare inputs for the micro 88 in anticipation of future functions.

In addition, configuration circuit 94 can be used to control at least the V*I switches to be described in connection with FIG. 9. The output voltage and current capability is defined by the configuration of these switches. Local circuitry 92 is provided as necessary to be dynamically programmed, such as the parameters of the monitoring circuits. These outputs can be used to effect that change. Local subsystems 94 are used by the micro 98 to control gas flow rate, defect isolation and product removal. A local power circuit 96 is used to tap off some part of the electricity generated by the fuel cell 12 to power the onboard electronics. This power supply circuit 96 will have its own regulation and conditioning circuits. A two-wire communications I/F device 98 may be integrated onto the chip to provide the electrical interface between communicating devices and a power bus (not shown) that connects them.

The microcontroller 8 is the heart of the integrated electronics subsystem. It is responsible for monitoring and controlling all designated system functions. In addition, it handles the communications protocol of any external communications. It is capable of "in circuit programming" so that its executive control program can be updated as required. It is capable of data storage and processing and is also capable of self/system diagnostics and security features.

Figure 9:
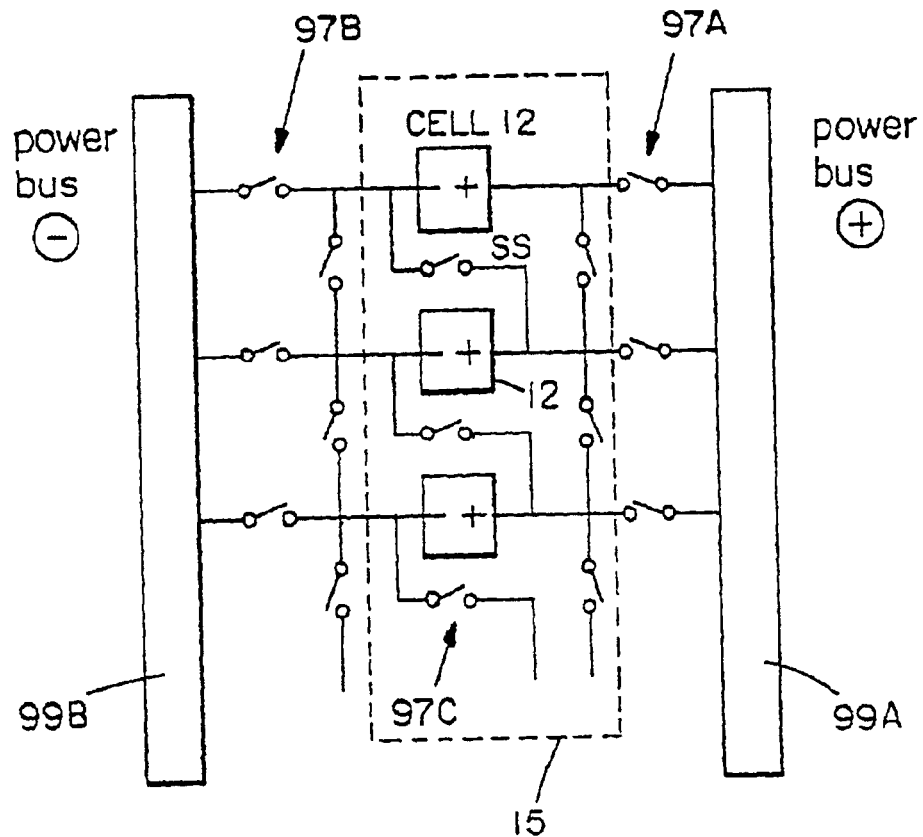
FIG. 9 is a schematic of the wiring for an integrated control system for the operation of individual cells or groups of cells.

Referring now to FIG. 9, further details of the invention are shown. In this embodiment, the individual power cells $12_1, 12_2$ - - - $12_4$ are formed on a wafer and wired in parallel across power buses 99A and 99B using transistor switches 97 which can be controlled from the microprocessor 88 of FIG. 8. Switches 97B and 97A are negative and positive bus switches respectively, whereas switch 97C is a series switch and switches 97D and 97E are respective positive and negative parallel switches respectively.

This allows the individual cells or groups of cells (power chip 15) to be wired in various configurations, i.e., parallel or series. Various voltages are created by wiring the cells in series. The current capacity can also be increased by wiring the cells in parallel. In general, the power profile of the power chip can be dynamically controlled to achieve or maintain a "programmed" specification. Conversely, the chip can be configured at the time of fabrication to some static profile and thus, eliminate the need for the power switches. By turning the switches on and off and by changing the polarity of wiring one can produce both AC and DC power output.

To implement a power management subsystem, feedback from the power generation process is required. Circuitry can be formed directly on the chip to constantly measure the efficiencies of the processes. This feedback can be used to modify the control of the system in a closed loop fashion. This permits a maximum level of system efficiency to be dynamically maintained. Some of these circuits are discussed next.

The quality of the power generation process will vary as the demands on the system change over time. A knowledge of the realtime status of several operational parameters can help make decisions which will enable the system to self-adjust, in order to sustain optimum performance. The boundaries of these parameters are defined by the program.

For example, it is possible to measure both the voltage and the current of an individual power cell or group of power cells. The power output can be monitored and if a cell or group is not performing, it can be removed if necessary. This can be accomplished by the power switches 97 previously described.

An average power level can also be maintained while moving the active "loaded" area around on the chip. This should give a better overall performance level due to no one area being on 100% of the time. This duty cycle approach is especially applicable to surge demands. The concept here is to split the power into pieces for better cell utilization characteristics.

It is expected that the thermal characteristics of the power chip will vary due to electrical loading and that this heat might have an adverse effect on power generation at the power cell level. Adequate temperature sensing and an appropriate response to power cell utilization will minimize the damaging effects of a thermal build up.

The lid 40 is the second piece of a two-piece "power chip" assembly. It is preferably made of metal to provide a mechanically rigid backing for the fragile semiconductor substrate 14. This allows for easy handling and provides a stable foundation upon which to build "power stacks", i.e., a plurality of power chips 15 that are literally stacked on top of each other. The purpose being to build a physical unit with more power.

Figure 10:
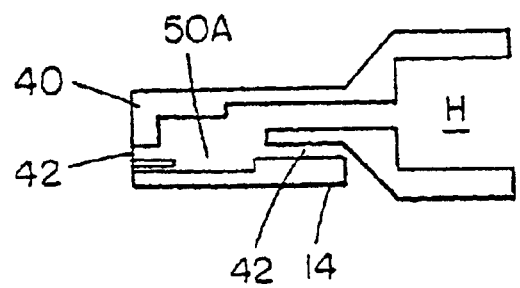
FIG. 10 is a schematic side view of a manifold system for a power cell.

FIG. 10 illustrates how the fuel 50A and oxidant/product channels 50A (and 50B not shown) may be etched into the surface of the substrate 14. These troughs are three sided and may be closed and sealed on the top side. The lid 40 and adhesive 42 provides this function of forming a hermetic seal when bonded to the substrate 14 and completes the channels. A matrix of fuel supply and oxidant and product water removal channels is thereby formed at the surface of the substrate.

The lid 40 provides a mechanically stable interface on which the input/output ports can be made. These are the gas supply and water removal ports. The design may encompass the size transition from the large outside world to the micrometer sized features on the substrate. This is accomplished by running the micrometer sized channels to a relatively much larger hole H. This larger hold will allow for less registration requirements between the lid and substrate. The large holes in the lid line up with the large holes in the substrate which have micrometer sized channels also machined into the substrate leading from the large hole to the power cells.

Each wafer may have its own manifolds. This would require external connections for the fuel supply, oxidant and product removal. The external plumbing may require an automated docking system.

Figure 11:
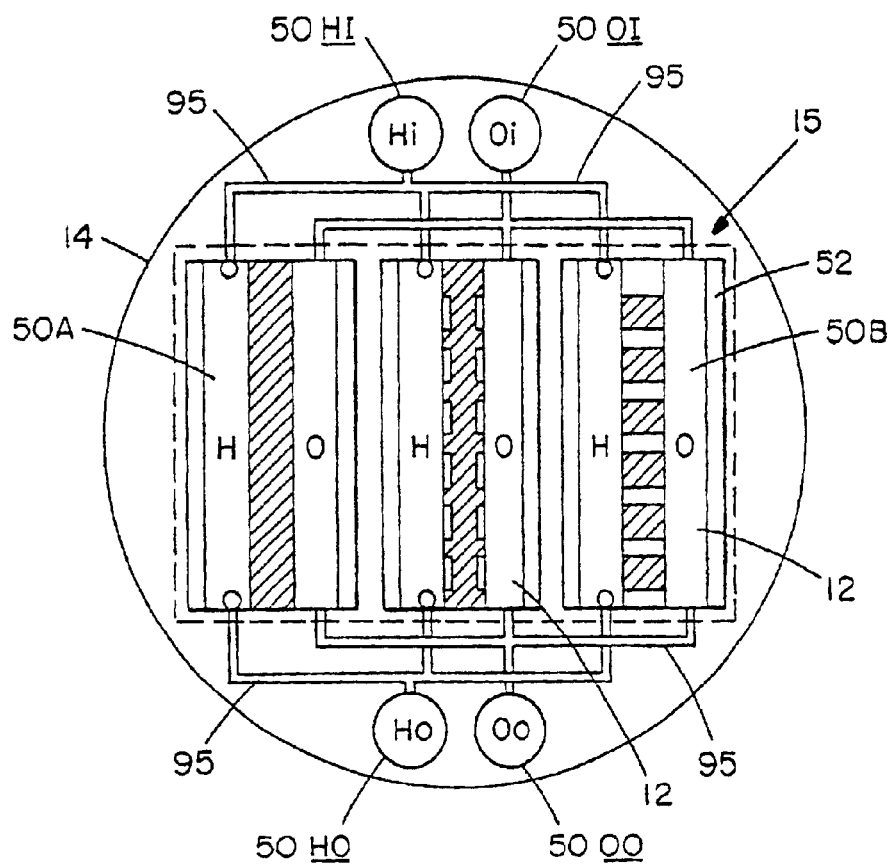
FIG. 11 is a schematic plan view of a plurality of cells arranged side-by-side on a wafer to form a power chip and stocked on top of each other to form a power disc.
Figure 12:
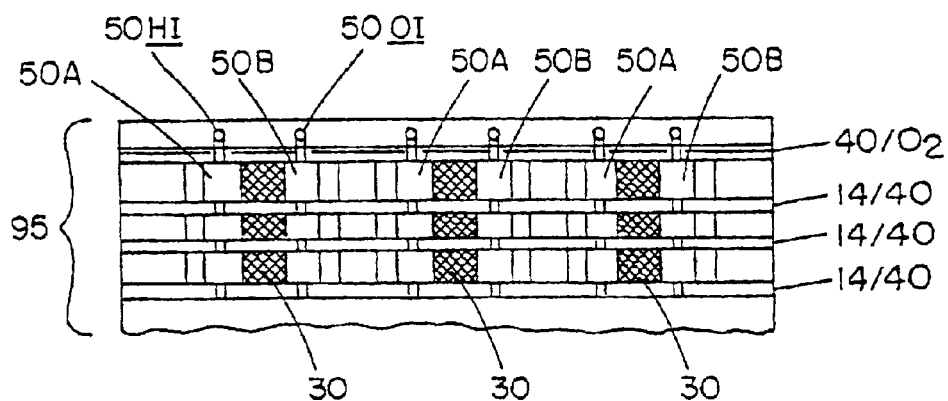
FIG. 12 is a fragmented side-view of FIG. 11.

FIGS. 11 and 12 illustrates one of many ways in which several cells 12 (in this example three cells side-by-side can be formed on a wafer 14 to form a power chip 15. Power disks can be stacked vertically upon each other to form a vertical column with inlet ports, 50HI, 50OI respectfully coupled to sources of hydrogen and oxygen respectively. The vertical column of wafers with power chips formed therein comprise a power stack (93).

FIG. 12 illustrates how stacking of a number of power discs 15 maybe used to form power stacks (93) with appreciable power. The use of the word "stacking" is reasonable for it suggests the close proximity of the wafers, allowing for short electrical interconnects and minimal plumbing. In reality, the stacking actually refers to combining the electrical power of the wafers to form a more powerful unit. They need only to be electrically stacked to effect his combination. However, it is desirable to produce the most amount of power in the smallest space and with the highest efficiencies. When considering the shortest electrical interconnect (power bussing) alternatives, one should also consider the possibility of using two of the main manifolds as electrical power busses. This can be done by electrically isolating these manifold/electrical power buss segments and using them to convey the power from each wafer to the next. This reduces the big power wiring requirements and permits this function to be done in an automated fashion with the concomitant increased accuracy and reliability.

A desirable manifold design would allow for power disc stacking. In this design the actual manifold 95 would be constructed in segments, each segment being an integral part of the lid 40. As the discs are stacked a manifold (tube) is formed. This type of design would greatly reduce the external plumbing requirements. Special end caps would complete the manifold at the ends of the power stack.

In summary, one of the primary objects of this invention is to be able to mass produce a power chip 15 comprised of a wafer 10 containing multiple power cells 12 on each chip 15 utilizing quasi standard semiconductor processing methods. This process inherently supports very small features. These features (power cells), in turn, are expected to create very small amounts of power per cell. Each cell will be designed to have the maximum power the material can support. To achieve any real substantially power, many millions will be fabricated on a single power chip 15 and many power chips fabricated on a "power disc" (semiconductor wafer 10). This is why reasonable power output can be obtained from a single wafer. A 10 uM×10 uM power cell would enable one million power cells per square centimeter. The final power cell topology will be determined by the physical properties of the constituent materials and their characteristics.

The basic electro-chemical reaction of the solid polymer hydrogen fuel cell is most efficient at an operating temperature somewhere between 80 to 100° C. This is within the operating range of a common semiconductor substrate like silicon. However, if the wafers are stacked additional heatsinking may be required. Since a cover is needed anyway, making the lid 40 into a heatsink for added margin makes sense.

The fuel and oxidant/product channels are etched into the surface of the semiconductor substrate. These troughs are three-sided and may be closed and sealed on the top side. The lid 40 provides this function. It is coated with an adhesive to form a hermetic seal when bonded to the semiconductor substrate and completes the channels. This forms a matrix of fuel supply and oxidant and product water removal channels at the surface of the semiconductor substrate. The power cells two primary channels are themselves separated by the PEM which is bonded to this same adhesive. Thus, removing any fine grain critical alignment requirements.

Equivalents

While this invention has been particularly shown and described with references to preferred embodiments thereof, it will be understood by those skilled in the art that various changes in form and details may be made therein without departing from the scope of the invention encompassed by the appended claims. For example, while silicon because of its well-defined electrical and mechanical properties is the material of choice for the substrate 14, other semiconductor materials may be substituted, therefore, such as Gd, Ge, or III–V compounds such as GaAs. Alternatively, the substrate for the cell may be formed of an amorphous material such as glass or plastic, or phenolic; in which case, the controls for the cells can be formed on a separate semiconductor die and electrically coupled to the cells to form a hybrid structure. The interface between the PEM's structure is preferably an assembled monolayer (SAM) interface formed of gold, however, other metals such as silver or platinum, may be used in place thereof. Likewise, although the PEM is formed of many molecular chains, it preferably has a base with an affinity for gold so that it will bond to the gold SAM feature. Again, other pure metals such as platinum and silver may be substituted therefore.

What is claimed is:

1. A fuel cell comprising:
   (a) a semiconductor substrate having:
      (i) at least one ion exchange membrane positioned substantially perpendicular to the substrate separating a source of oxygen from a source of hydrogen,
      (ii) an outlet path for removing water formed as a product of reaction between the oxygen and the hydrogen,
      (iii) a first electrode on a first side of the membrane and a second electrode on a second side of the membrane;
      (iv) a catalyst in electrical communication with said membrane sides and electrodes;
   (b) a cover made from a gas impermeable material which forms a seal with the membrane; and
   (c) a load coupled to said electrodes to enable extraction of power generated by said reaction.

2. The fuel cell of claim 1 wherein the catalyst is incorporated in the first and second electrodes.

3. The fuel cell of claim 1 wherein the membrane is formed of a polymer.

4. The fuel cell of claim 1 wherein the electrodes are formed of an electrically conductive polymer.

5. A fuel cell comprising:
   (a) a substrate;
   (b) first and second flow paths in the substrate for admitting fuel into the first flow path and oxidant into the second flow path;
   (c) a membrane positioned substantially perpendicular to the substrate enclosing an area and having a first and second side separating the inside flow path from the outside flow path;
   (d) a first electrode on the first side of the membrane and a second electrode on the second side of the membrane;
   (e) a catalyst in electrical communication with the membrane sides and the electrodes; and
   (f) a cover made from a gas impermeable material which forms a seal with the membrane.

6. The fuel cell of claim 5 wherein the catalyst is incorporated in the first and second membrane sides.

7. The fuel cell of claim 5 wherein the catalyst is incorporated within the electrodes.

8. The fuel cell of claim 5 wherein the electrodes are formed of an electrically conductive polymer.

9. The cell of claim 5 in which the membrane is a proton exchange membrane.

10. The fuel cell of claim 5 in which the membrane is formed of a polymer.

11. The fuel cell of claim 10 in which the polymer is built in layers.

12. The fuel cell of claim 5 wherein the membrane is cast.

13. The fuel cell of claim 12 wherein the membrane is etched to create the first and second sides.

14. The fuel cell of claim 12 wherein the membrane is cast using a spin coating process.

15. The fuel cell of claim 5 wherein the membrane is corrugated to increase surface area.

16. The fuel cell of claim 5 wherein the substrate has holes through which fuel or oxidant or a reaction product flows substantially perpendicular to the plane of the substrate.

17. The fuel cell of claim 16 wherein the holes supply fuel or oxidant to the inside or outside of fuel cell.

18. The fuel cell of claim 5 wherein electrically conductive material crosses under the membrane for interconnection to the electrodes.

19. A power chip comprising:
   (a) a monolithic substrate;
   (b) an array of fuel cells comprising:
      (i) a plurality of first and second flow paths in the substrate for admitting fuel into the first flow path and oxidant into the second flow path;
      (ii) a plurality of membranes positioned substantially perpendicular to the substrate having first and second sides separating the first flow path from the second flow path;
      (iii) a first electrode on the first side of each of the membranes and a second electrode on the second side of each of the membranes;
      (iv) a catalyst in electrical communication with the first and second membrane sides and the electrodes;
      (v) a cover made from a gas impermeable material which forms a seal with the membranes of said array;
   (c) fuel cells of said array being electrically interconnected to form a power chip;
   (d) a plurality of manifolds enclosing said array to distribute fuel and oxidant to the power cells; and
   (e) at least one power terminal coupled to the fuel cells,
      (iv) a catalyst in electrical communication with the first and second membrane sides and the electrodes;
      (v) a cover made from a gas impermeable material which forms a seal with the membranes of said array;
   (c) fuel cells of said array being electrically interconnected to form a power chip;
   (d) a plurality of manifolds enclosing said array to distribute fuel and oxidant to the power cells; and
   (e) a plurality of power terminals.

20. The power chip of claim 19 wherein the substrate is formed of an insulator.

21. The power chip of claim 20 wherein the insulator is taken from the group of sapphire, glass, phenolic material.

22. The power chip of claim 19 wherein the substrate is formed of semiconductor material.

23. The power chip of claim 22 wherein the semiconductor is taken from the group comprising Si, Ga, or GaAs.

24. The power chip of claim 19 wherein lids of fuel cells in said array are integrated with the manifold.

25. The power chip of claim 19 wherein a plurality of fuel cells are electrically interconnected via switches, fuses and metal links, in a configurable manner.

26. The power chip of claim 25 wherein the switches are semiconductor transistors integrated on to the substrate.

27. The power chip of claim 25 wherein the configuration is one time programmable.

28. The power chip of claim 25 wherein the configuration is under control of a microcontroller.

29. The power chip of claim 25 wherein the switches under control provide for dynamic active area control to optimize fuel consumption and operating efficiencies.

30. The power chip of claim 19 wherein one or more microcontrollers monitor performance parameters including power output, temperature and fuel consumption.

31. The power chip of claim 19 wherein one or more microcontrollers are integrated on to the substrate.

32. The power chip of claim 19 further comprising a plurality of integrated sensors for sensing temperature, voltage, current and gas pressure and flow.

33. The power chip of claim 19 wherein the chip supports internal and external communications interface.

34. The power chip of claim 33 wherein the communications interface uses the power terminals.

35. The power chip of claim 19 wherein: power output is programmable.

36. The power chip of claim 19 wherein power output can be AC or DC.

37. A power disk comprising:
(a) a planar substrate;
(b) at least one power chip comprising:
    (i) a plurality of flow paths in the substrate for admitting fuel and oxidant;
    (ii) the array of fuel cells; of claim 19 and
    (iii) a plurality of power terminals coupled to the fuel cells;
(c) at least one manifold enclosing said array to distribute fuel and oxidant to the power chips; and
(d) at least one power bus terminal coupled to the at least one power chip.

38. A power stack comprising:
(a) the plurality of power disks arranged adjacent with respect to each other;
(b) electrical interconnect between said of claim 37; and
(c) a manifold to supply fuel and oxidant to the power disks.

39. A power stack of claim 38 wherein the flow paths between the power disks are self coupling.

40. A power stack of claim 38 wherein a power bus between the power disks are self coupling.

41. A fuel cell comprising:
(a) a monolithic substrate having:
    (i) at least one membrane positioned substantially perpendicular to the substrate physically separating a source of oxidant from a source of fuel while enabling a reaction to occur between the oxidant and the fuel;
    (ii) a first electrode on a first side of the membrane and a second electrode on a second side of the membrane;
    (iii) an outlet path for removing water formed as a product of said reaction between the oxidant and the fuel,
(b) a cover made from a gas impermeable material which forms a seal with the membrane.

42. The fuel cell of claim 41 further comprising a catalyst in electrical communication with said membrane sides and electrodes.

43. The fuel cell of claim 42 wherein the catalyst is incorporated within the electrodes.

44. The fuel of claim 41 wherein the membrane is an ion exchange membrane.

45. The fuel cell of claim 41 wherein the membrane is formed of a polymer.

46. The fuel cell of claim 41 wherein the electrodes are formed of an electrically conductive polymer.

47. The fuel cell of claim 41 wherein a load is coupled to said electrodes to enable extraction of power generated by said reaction.

48. A fuel cell comprising:
(a) three flow channels, an inner channel and two outer channels, in a substrate wherein each outer channel is separated from the inner channel by a wall having a plurality of vertical slits;
(b) an electrode on a base of an outer side of each wall;
(c) a catalyst plurality of tines formed between the slits, and wherein said catalyst contacts said electrodes;
(d) at least one membrane positioned substantially perpendicular to the substrate and disposed in the inner channel; and
(e) a lid made from a gas impermeable material which forms a seal with the substrate.

* * * * *

UNITED STATES PATENT AND TRADEMARK OFFICE
CERTIFICATE OF CORRECTION

PATENT NO. : 6,815,110 B2
DATED : November 9, 2004
INVENTOR(S) : Stephen A. Marsh It is certified that error appears in the above-identified patent and that said Letters Patent is hereby corrected as shown below:

Title page,
Item [57], ABSTRACT,
Line 6, delete "the other reacts" and insert -- the other. The hydrogen reacts --.

Column 10,
Line 33, replace the comma at the end of the line with a period.
Lines 34-42, delete:
    (iv) a catalyst in electrical communication with the first and second
    membrane sides and the electrodes;
    (v) a cover made from a gas impermeable material which forms a
    seal with the membranes of said array;
(c) fuel cells of said array being electrically interconnected to form a power chip;
(d) a plurality of manifolds enclosing said array to distribute fuel and
oxidant to the power cells; and
(e) a plurality of power terminals."

Column 11,
Line 10, delete the colon between the words "wherein" and "power".
Line 19, delete the semi-colon after "cells" and insert a semi-colon after "19".
Line 30, delete "said of claim 37" and insert -- said power disks of claim 37 --.

Signed and Sealed this

Seventeenth Day of May, 2005

JON W. DUDAS
*Director of the United States Patent and Trademark Office*